(12) United States Patent
Choi et al.

(10) Patent No.: US 11,325,692 B1
(45) Date of Patent: May 10, 2022

(54) PROPELLER FOLDING APPARATUS OF AIR MOBILITY VEHICLE

(71) Applicants: HYUNDAI MOTOR COMPANY, Seoul (KR); KIA CORPORATION, Seoul (KR)

(72) Inventors: Jae Young Choi, Seongnam-si (KR); Sang Hyun Jung, Hwaseong-si (KR); Kyu Hoon Cho, Suwon-si (KR); Chung Sik Yim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/317,080

(22) Filed: May 11, 2021

(30) Foreign Application Priority Data

Oct. 28, 2020 (KR) .................. 10-2020-0141271

(51) Int. Cl.
*B64C 11/28* (2006.01)
*B64C 11/04* (2006.01)

(52) U.S. Cl.
CPC .............. *B64C 11/28* (2013.01); *B64C 11/04* (2013.01)

(58) Field of Classification Search
None
See application file for complete search history.

(56) References Cited

U.S. PATENT DOCUMENTS

| | | | | |
|---|---|---|---|---|
| 10,442,521 | B1* | 10/2019 | Ellzey | ........................ B64C 5/12 |
| 10,669,869 | B1* | 6/2020 | Urban | ........................ F01D 7/02 |
| 2016/0272292 | A1* | 9/2016 | Skrydstrup | .............. B63H 1/22 |
| 2017/0260973 | A1* | 9/2017 | Larson | ..................... B64D 5/00 |
| 2018/0346136 | A1* | 12/2018 | Arkus | ........................ B64C 1/063 |
| 2019/0055003 | A1* | 2/2019 | Luo | ............................ B64C 27/50 |
| 2019/0061914 | A1* | 2/2019 | Heranger | ................. B64C 27/50 |
| 2019/0210718 | A1 | 7/2019 | Wang | |
| 2019/0248464 | A1* | 8/2019 | Ye | ............................. B64C 1/061 |
| 2019/0382106 | A1* | 12/2019 | Prager | ................... B64C 27/022 |
| 2019/0389569 | A1 | 12/2019 | Paulson et al. | |
| 2020/0317325 | A1* | 10/2020 | Zhang | ................... B64C 39/024 |
| 2021/0139132 | A1* | 5/2021 | Chen | ........................ B64C 27/48 |
| 2021/0206462 | A1* | 7/2021 | Skrydstrup | .............. B63H 1/24 |

FOREIGN PATENT DOCUMENTS

KR 10-2020-0104582 A 9/2020

* cited by examiner

*Primary Examiner* — Michael Lebentritt
(74) *Attorney, Agent, or Firm* — Lempia Summerfield Katz LLC

(57) ABSTRACT

A propeller folding apparatus of an air mobility vehicle deploys or folds propeller blades depending on the flying state of the air mobility vehicle. The propeller blades are efficiently used depending on the flying state of the air mobility vehicle. The energy efficiency and the ferry range of the air mobility vehicle are increased.

13 Claims, 8 Drawing Sheets

PROPELLER FOLDING APPARATUS OF AIR MOBILITY VEHICLE

CROSS REFERENCE TO RELATED APPLICATION

This application claims priority to and the benefit of Korean Patent Application No. 10-2020-0141271, filed on Oct. 28, 2020, the entire contents of which are incorporated herein by reference.

FIELD

The present disclosure generally relates to a propeller folding apparatus of an air mobility vehicle and, more particularly, to a propeller folding apparatus of an air mobility vehicle, the propeller folding apparatus being able to deploy or fold a propeller depending on the flying state of the air mobility vehicle.

BACKGROUND

The statements in this section merely provide background information related to the present disclosure and may not constitute prior art.

Recently, the development of air mobility vehicles usable for a variety of purposes, such as freight transportation or medical transportation, has been underway. Flying mobility vehicles are entering the stage of practical use, due to increased energy efficiencies and reliabilities thereof.

Such air mobility vehicles may fly by operating propellers, which also enable takeoff and landing. The takeoff and landing requires a greater amount of thrust and a greater number of revolutions of the propellers than when during flight. In contrast, when an air mobility vehicle is in a flying state, the operation of some of the propellers used in vertical takeoff is no longer required. We have discovered that when the air mobility vehicle is in a high-speed flying state, the propellers generate air drag, thereby causing energy loss during the flight.

The foregoing is intended merely to aid in the understanding of the background of the present disclosure, and is not intended to mean that the present disclosure falls within the purview of the related art that is already known to those skilled in the art.

SUMMARY

The present disclosure proposes a propeller folding apparatus of an air mobility vehicle. In particular, the propeller folding apparatus is able to deploy or fold propeller blades depending on the flying state of the air mobility vehicle, so that the propeller blades may be efficiently used depending on the flying state of the air mobility vehicle, thereby increasing the energy efficiency and the ferry range of the air mobility vehicle.

In one aspect of the present disclosure, a propeller folding apparatus of an air mobility vehicle includes: a lower plate connected to a drive shaft of a drive motor generating rotational force, the lower plate including a pivot unit on which a propeller blade is mounted, the pivot unit being configured to be pivotable such that the propeller blade is deployed or folded depending on positions of the pivot unit; an upper plate disposed on the lower plate to be movable in upward and downward directions such that the upper plate allows the pivot unit to pivot or causes the positions of the pivot unit to be fixed; and a guide coupled to the upper plate and connected to the pivot unit so as to change the pivot position of the pivot unit in response to the upper plate moving in the upward and downward directions so that the propeller blade is deployed or folded.

The propeller folding apparatus may further include a sub-motor including a sub-shaft coupled to the upper plate, wherein the sub-motor moves the sub-shaft in the upward and downward directions so as to adjust a position of the upper plate in the upward and downward directions.

A drive shaft may be coupled to a bottom portion of the lower plate, a connecting shaft extending downward from the upper plate may be connected to a top portion of the lower plate, and the drive shaft and the connecting shaft may be coaxially arranged to each other.

The drive shaft may have a cylindrical shape having a hollow interior. The connecting shaft may be inserted into the hollow interior of the drive shaft through the lower plate.

The lower plate may have a polygonal through-hole through which the connecting shaft extends. The connecting shaft may include: a top end portion having a polygonal shape to match to the polygonal through-hole, and a bottom end portion famed to match to the hollow interior of the drive shaft.

The sub-motor may be provided below the drive motor, and the sub-shaft may be inserted into the drive shaft so as to be connected to the connecting shaft.

The sub-shaft and the connecting shaft may be connected to each other via a bearing, such that the sub-shaft is non-rotatable and the connecting shaft is rotatable.

The pivot unit may include a mounting end portion on which the propeller blade is mounted and a pivot end portion pivotably disposed on the lower plate, with a guide pin protruding from a peripheral portion of the pivot end portion. The guide may be configured to surround the pivot end portion, and has a guide hole into which the guide pin is inserted, the guide hole extending along a path in upward and downward directions.

The guide hole may include a linear section extending in the upward and downward directions and an inclined section extending downward from the linear section.

The linear section may extend to a length to which the pivot unit is allowed to pivot when the upper plate moves upwards. An angle of inclination and a length of the inclined section may be determined such that the pivot unit pivots in response to an upward movement of the upper plate so that the propeller blade is folded.

The lower plate may include a lower stopper provided around the pivot unit, such that, when the propeller blade is moved to a deployed position or a folded position in response to pivoting of the pivot unit, the lower stopper restricts the pivoting of the pivot unit.

The lower stopper may extend to surround a portion of the pivot unit, and may be configured to be in contact with the mounting end portion of the pivot unit when the propeller blade is moved to the deployed position or the folded position.

The upper plate may include an upper stopper extending downward and allowing the pivot unit to be seated therein. The upper stopper may be configured to fix the positions of the pivot unit when the upper plate is moved downwards The propeller folding apparatus of an air mobility vehicle having the above described structure may deploy or fold the propeller blades depending on the flying state of the air mobility vehicle. The propeller blades may be efficiently used depending on the flying state of the air mobility vehicle, thereby increasing the energy efficiency and the ferry range of the air mobility vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
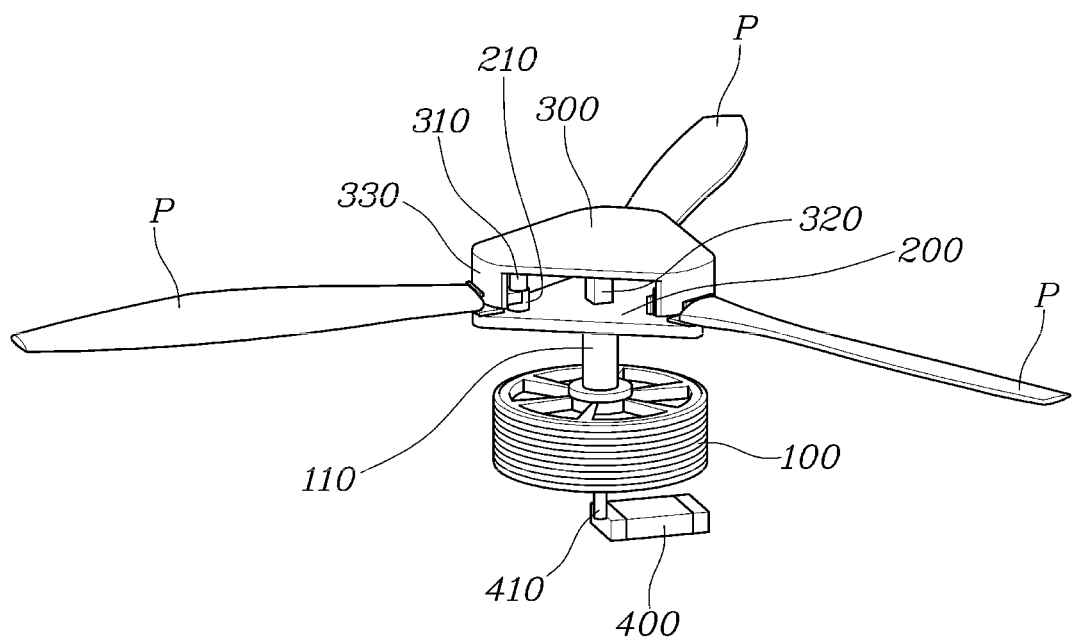
FIGS. 1 and 2 are views illustrating a deployed state of a propeller folding apparatus of an air mobility vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a propeller folding apparatus of an air mobility vehicle according to exemplary foams of the present disclosure will be described in detail with reference to the accompanying drawings.

Figure 2:
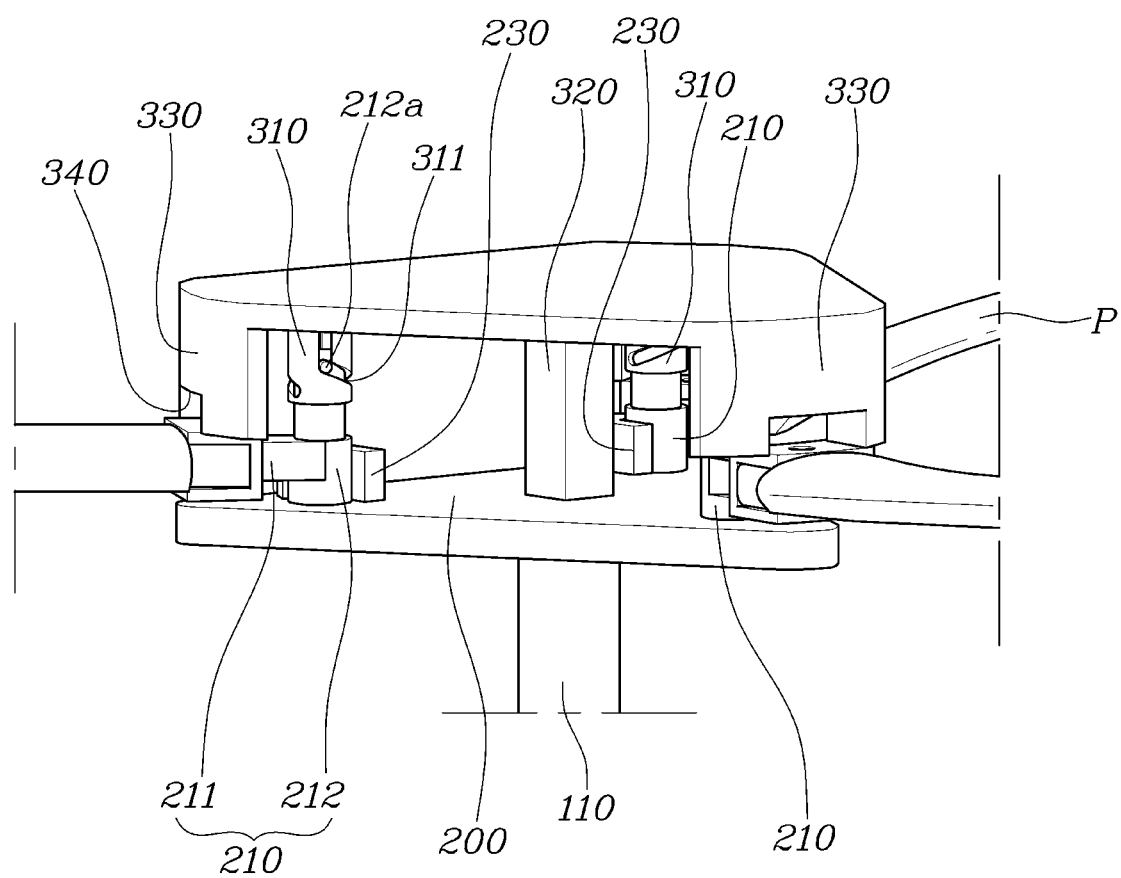
Figure 3:
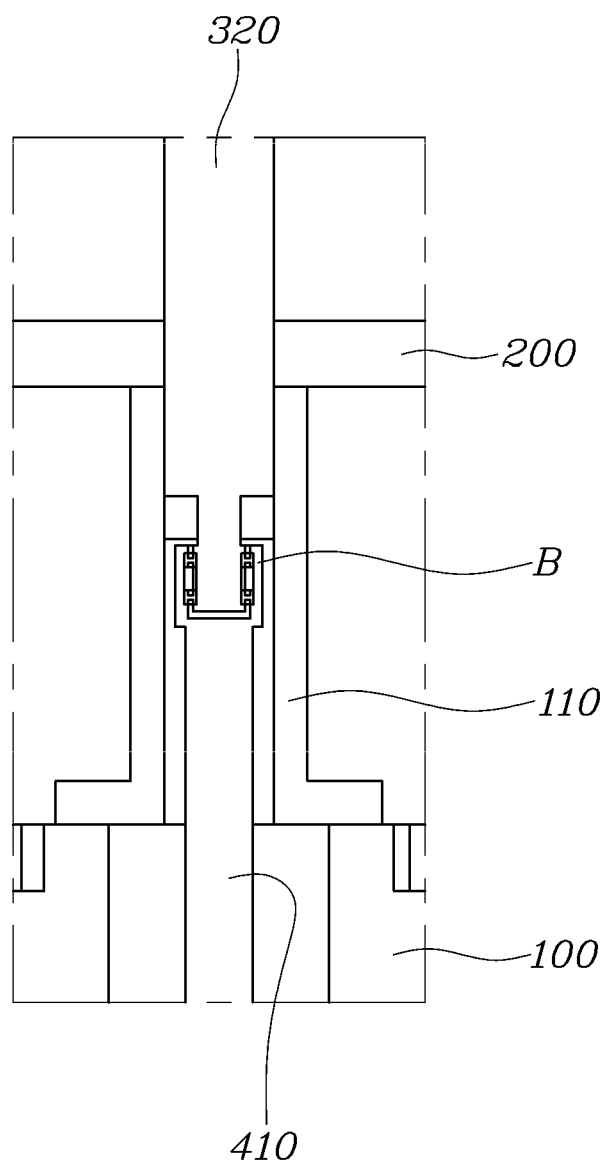
FIG. 3 is a view illustrating a driving shaft and a connecting shaft of the propeller folding apparatus of an air mobility vehicle illustrated in FIG. 1.
Figure 4:
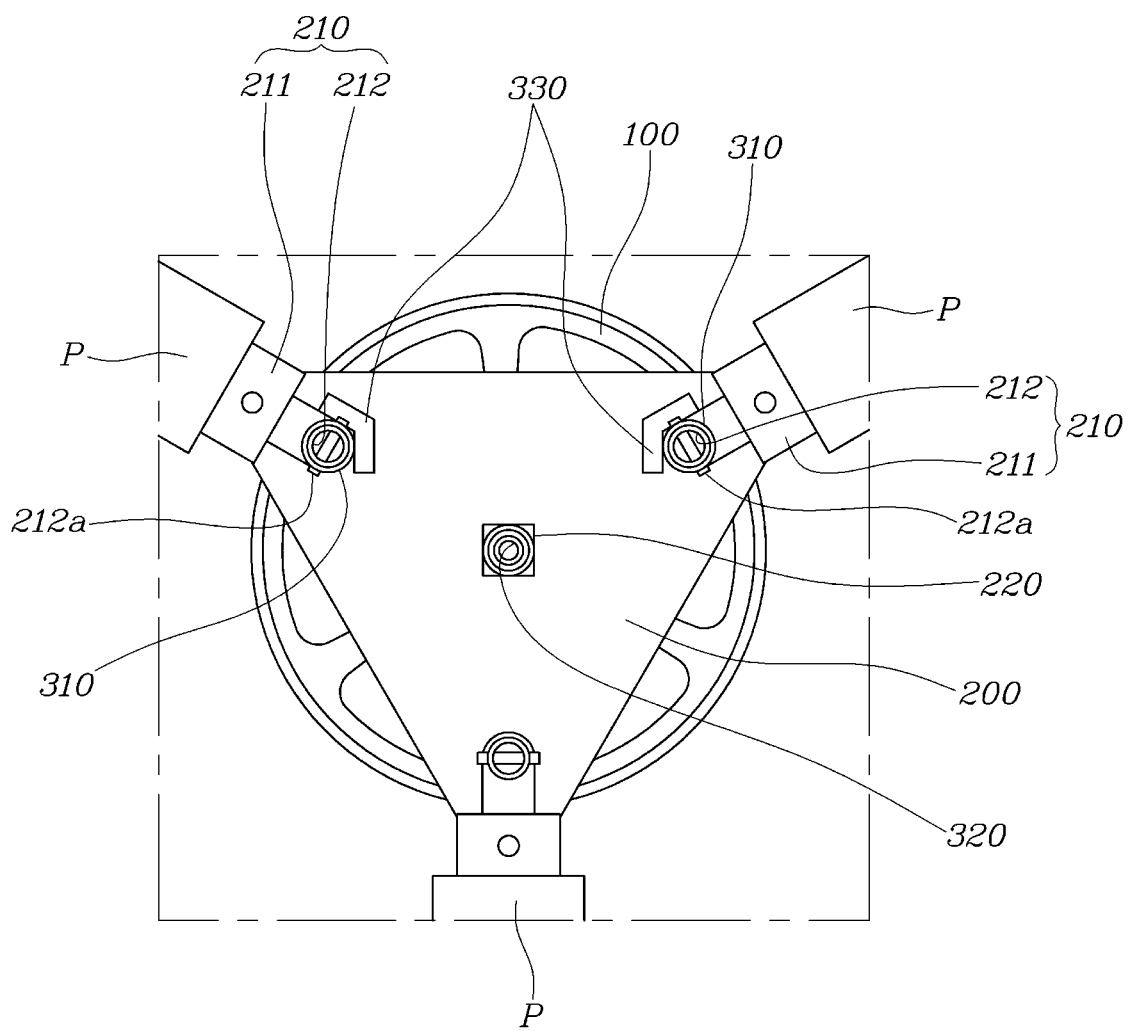
FIG. 4 is a view illustrating a lower plate and pivot units of the propeller folding apparatus of an air mobility vehicle.
Figure 5:
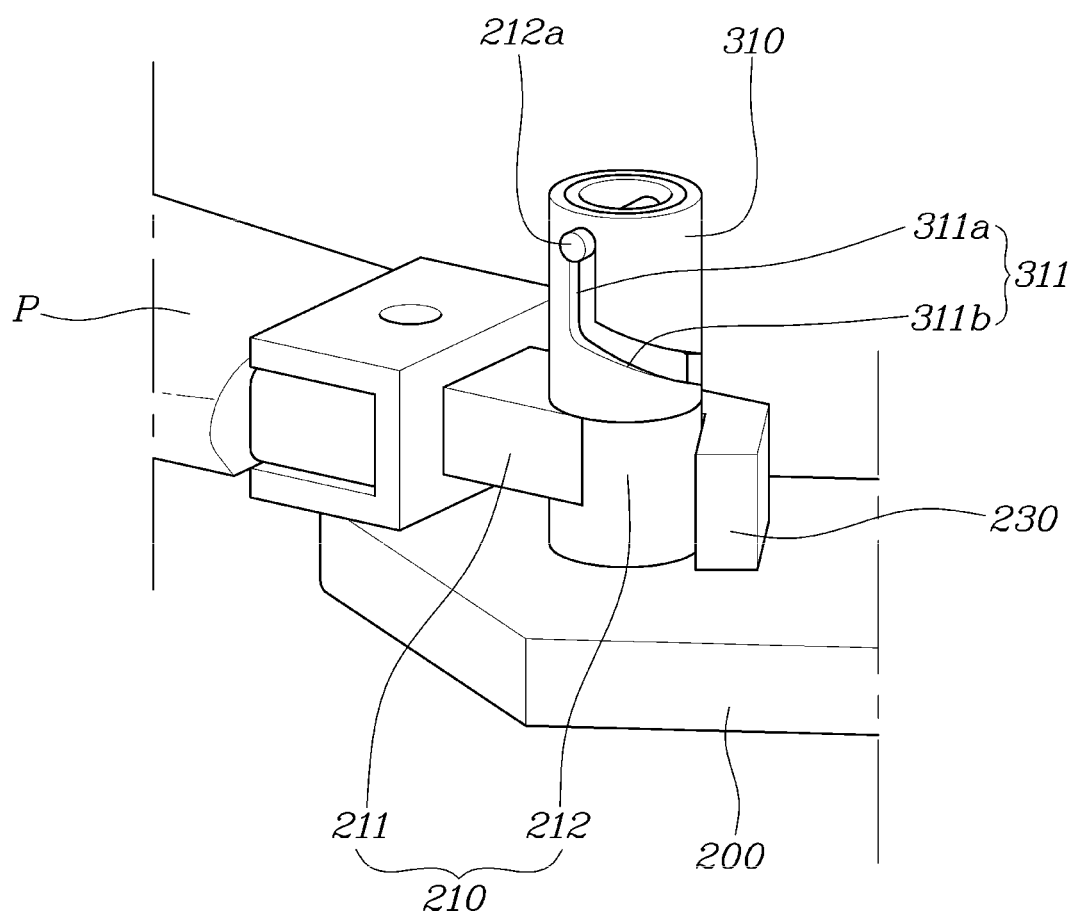
FIGS. 5 to 7 are views illustrating the operation of the pivot unit of the propeller folding apparatus of an air mobility vehicle.
Figure 6:
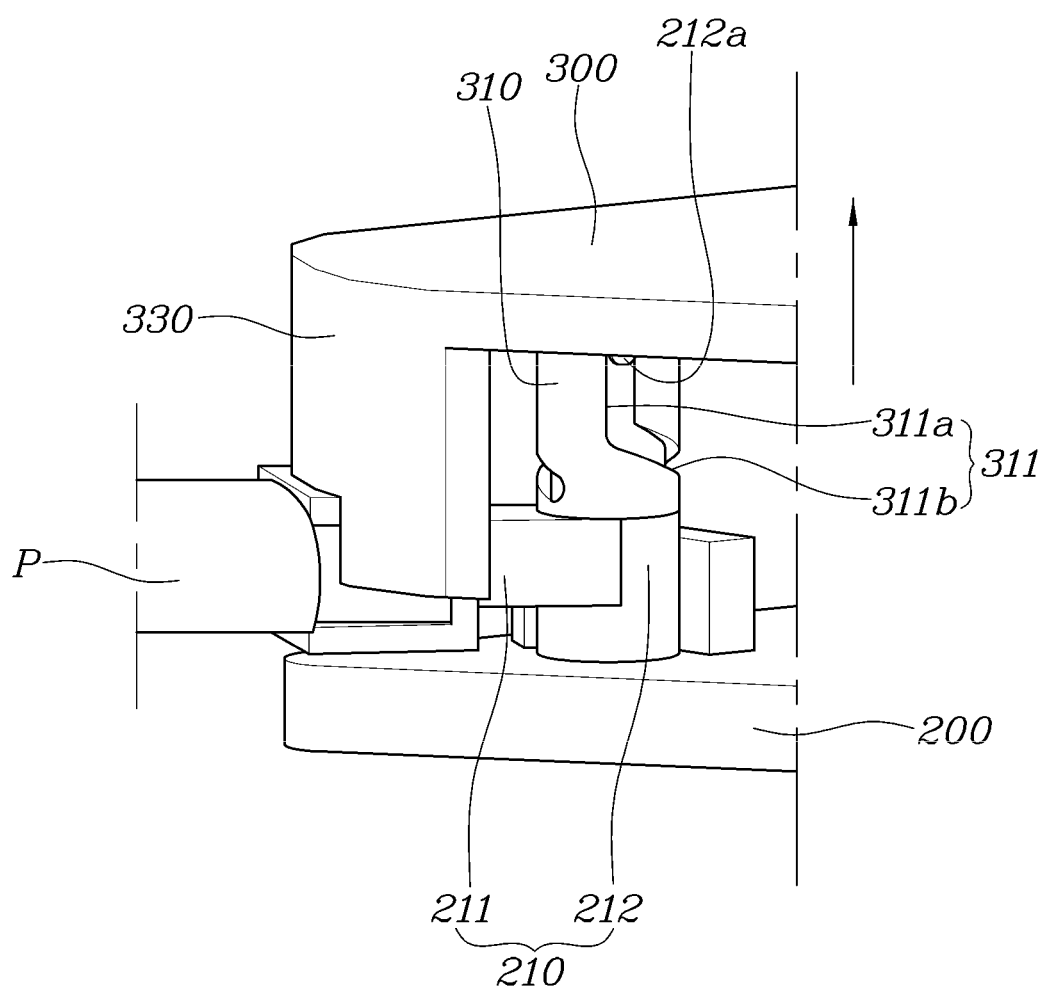
Figure 7:
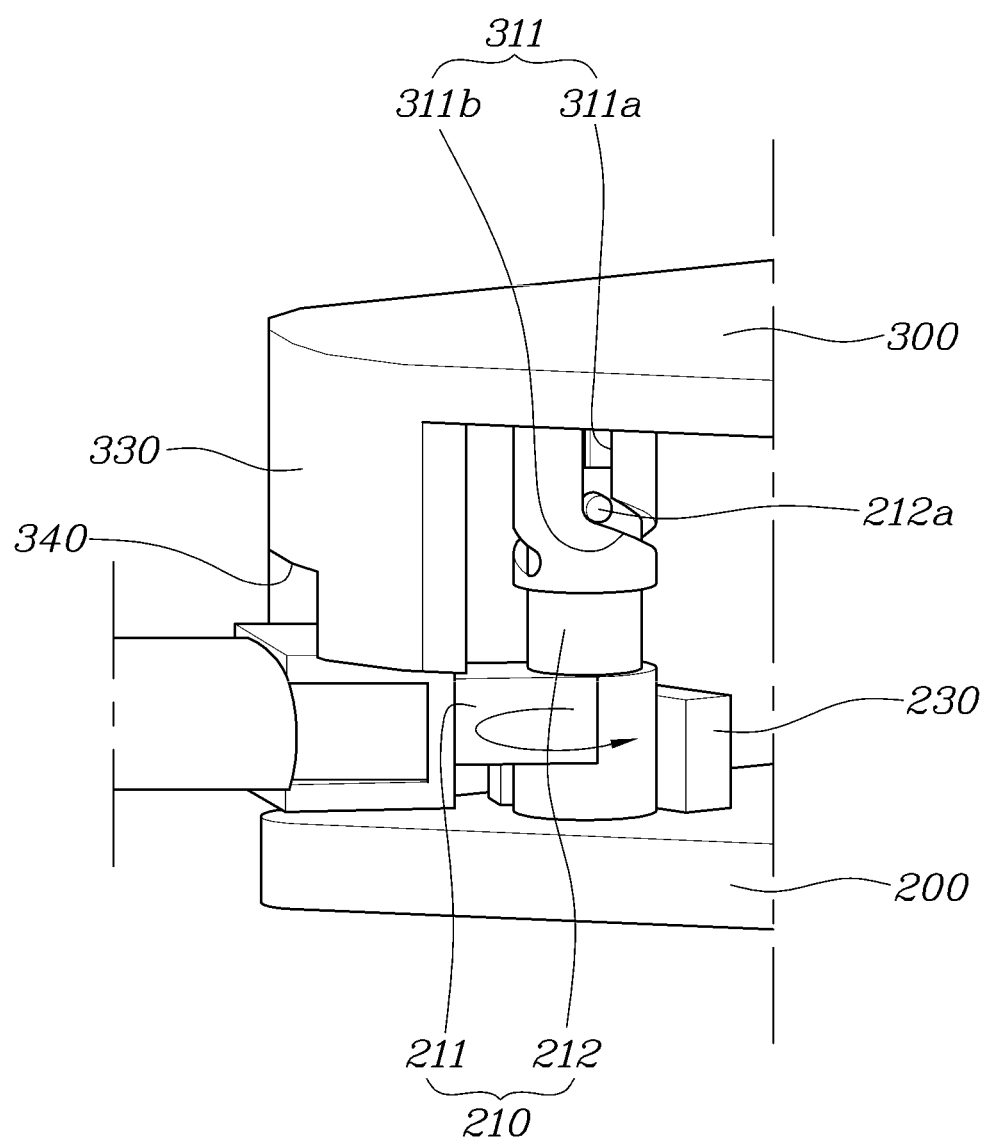
Figure 8:
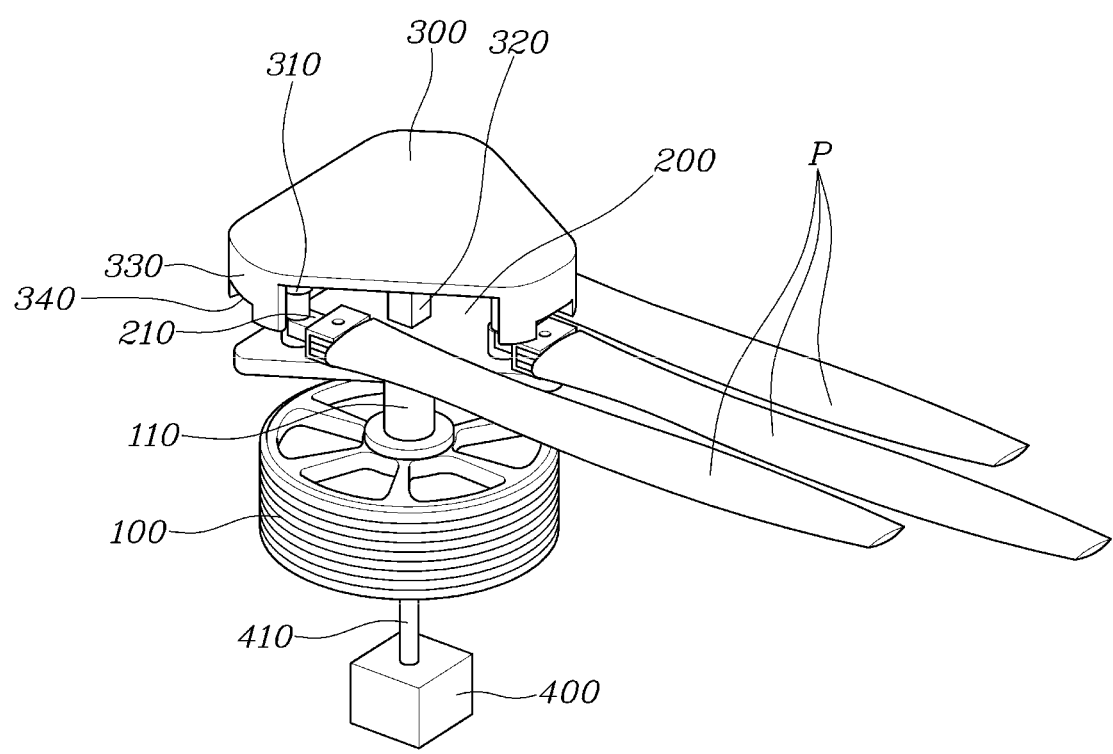
FIG. 8 is a view illustrating the folded state of the propeller folding apparatus of an air mobility vehicle according to one form of the present disclosure.

FIGS. 1 and 2 are views illustrating a deployed state of a propeller folding apparatus of an air mobility vehicle according to one form of the present disclosure, FIG. 3 is a view illustrating a driving shaft and a connecting shaft of the propeller folding apparatus of an air mobility vehicle illustrated in FIG. 1, FIG. 4 is a view illustrating a lower plate and pivot units of the propeller folding apparatus of an air mobility vehicle, FIGS. 5 to 7 are views illustrating the operation of the pivot unit of the propeller folding apparatus of an air mobility vehicle, and FIG. 8 is a view illustrating the folded state of the propeller folding apparatus of an air mobility vehicle according to another form of the present disclosure.

As illustrated in FIGS. 1 and 2, the propeller folding apparatus of an air mobility vehicle includes: a lower plate 200, an upper plate 300, and guides 310. The lower plate 200 is connected to a drive shaft 110 of a drive motor 100 generating rotational force, and includes pivot units 210 on which propeller blades P are mounted, the pivot units 210 being configured to be pivotable such that the propeller blades P may be deployed or folded depending on the position of the pivot units 210. The upper plate 300 is disposed on the lower plate 200 to be movable in upward and downward directions such that the upper plate 300 allows the pivot units 210 to pivot or fixes the positions of the pivot units 210. The guides 310 are coupled to the upper plate 300 and connected to the pivot units 210 so as to change the pivot positions of the pivot units 210 in response to the upper plate 300 moving in the upward and downward directions so that the propeller blades are deployed or folded. Here, the drive motor 100 and a sub-motor 400, which will be described later, may operate under the control of a motor controller.

The propeller folding apparatus according to the present disclosure may be disposed on a body or a wing of an air mobility vehicle. When the drive motor 100 is operated, the lower plate 200 is rotated to rotate the propeller blades P, thereby generating thrust, so that the air mobility vehicle may fly.

Although it is illustrated in the drawings that the upper plate 300, the lower plate 200, and the drive motor 100 are disposed in the top-to-bottom direction, those components may be arranged reversely. In addition, a plurality of propeller blades P may be provided on the lower plate 200 via the pivot units 210. Some of the propeller blades P may be disposed on the lower plate 200 via the pivot units 210 so as to be deployed or folded.

The drive motor 100 includes the drive shaft 110, and the lower plate 200 is connected to the drive shaft 110, such that the lower plate 200 is rotated by the rotational force of the drive motor 100 transferred thereto. The pivot units 210, on which the propeller blades P are mounted, may be pivotably disposed on the lower plate 200 such that the propeller blades P may be deployed or folded depending on the pivot positions of the pivot units 210. The pivot positions of the pivot units 210 are fixed by the upper plate 300 that is disposed on the lower plate 200 so as to be movable in the upward and downward directions. Consequently, the pivot positions of the pivot units 210 are fixed by the upper plate 300, so that the propeller blades P may remain deployed or folded. In particular, the guides 310 of the upper plate 300 are connected to the pivot units 210 so as to change the pivot positions of the pivot units 210 depending on the movement of the upper plate 300 in the upward and downward directions.

Here, the propeller folding apparatus further includes the sub-motor 400 including a sub-shaft 410 coupled to the upper plate 300. The sub-shaft 410 is configured to move in the upward and downward directions so as to adjust the position of the upper plate 300 in the upward and downward directions. Accordingly, the position of the upper plate 300 may be adjusted in the upward and downward directions depending on whether or not the sub-motor 400 operates, thereby changing the pivot positions of the pivot units 210 or fixing the positions of the pivot units 210.

For example, when the upper plate 300 moves upwards in response to the operation of the sub-motor 400, a change in the pivot positions of the pivot units 210 may be allowed, and the guides 310 of the upper plate 300 may pivot the pivot units 210, thereby folding the propeller blades P. Consequently, air drag caused by the propeller blades P during the flight of the air mobility vehicle at a high speed may be reduced, thereby enabling the air mobility vehicle to fly efficiently. In addition, when the air mobility vehicle is stored, the propeller blades P may be folded, thereby reducing a storage space.

In contrast, when the upper plate 300 moves downwards, the guides 310 pivot the pivot units 210, thereby deploying the propeller blades P, and a change in the pivot positions of the pivot units 210 is restricted by the upper plate 300. Consequently, the air mobility vehicle may take off and land by the rotation of the propeller blades P in response to the operation of the drive motor 100. Since the positions of the propeller blades P are fixed by the upper plate 300, the reliability of the propeller blades P is ensured.

Describing the present disclosure in more detail, as illustrated in FIG. 2, the drive shaft 110 is coupled to the bottom portion of the lower plate 200, and a connecting shaft 320 extending downward from the upper plate 300 is connected to the top portion of the lower plate 200 so as to be coaxial with the drive shaft 110. Here, the lower plate 200 may have the shape of a plate, with the plurality of pivot units 210 being provided on the peripheral portions thereof, and the propeller blades P are mounted on the pivot units 210, respectively. Since the drive shaft 110 and the connecting shaft 320 are connected to the bottom portion and the top portion of the central portion of the lower plate 200, respectively, and the drive shaft 110 and the connecting shaft 320 are concentric, the drive shaft 110, the lower plate 200, and the connecting shaft 320 may be reliably rotated by the rotational force supplied by the drive motor 100. The upper plate 300 may also have the shape of a plate like the lower plate 200, and the connecting shaft 320 may extend from the central portion of the upper plate 300.

As illustrated in FIG. 3, the drive shaft 110 has the shape of a hollow cylinder, and the connecting shaft 320 is inserted into the drive shaft 110 through the lower plate 200. Due to this configuration, the connecting shaft 320 is connected to both the lower plate 200 and the drive shaft 110, thereby obtaining the coupling strength of the connecting shaft 320, such that the upper plate 300 may be strongly fixed to the lower plate 200. In addition, the strength of the drive shaft 110 having the hollow interior may be increased, due to the connecting shaft 320 being inserted into the drive shaft 110.

In one form, as illustrated in FIG. 4, the lower plate 200 has a polygonal through-hole 220 through which the connecting shaft 320 extends. The connecting shaft 320 is configured such that the top end portion thereof has a polygonal shape to match to the through-hole 220 and the bottom end portion thereof matches to the hollow interior of the drive shaft 110. Thus, the connecting shaft 320 of the upper plate 300 may be inserted into the drive shaft 110 through the through-hole 220 of the lower plate 200. In particular, since the top end portion of the through-hole 220 and the top end portion of the connecting shaft 320 are polygonal, the connecting shaft 320 may rotate together with the lower plate 200, and the top-bottom movement of the connecting shaft 320 in the through-hole 220 is allowed. The bottom end portion of the connecting shaft 320 may have a circular shape matching to the hollow interior of the drive shaft 110. Accordingly, the upper plate 300 is disposed on the lower plate 200 via the connecting shaft 320 so as to be movable in the upward and downward directions and rotatable together with the lower plate 200.

The sub-motor 400 is provided below the drive motor 100 and the sub-shaft 410 is inserted into the drive shaft 110 so as to be connected to the connecting shaft 320. Thus, moving the sub-shaft 410 by the operation of the sub-motor 400 may move the connecting shaft 320. Here, the sub-motor 400 may be implemented as an actuator that withdraws or retracts the sub-shaft 410 in a linear direction. Since the sub-shaft 410 is inserted into the drive shaft 110 and connected to the connecting shaft 320, the connecting shaft 320 may be moved by the linear movement of the sub-shaft 410 so that the upper plate 300 may be moved in the upward and downward directions. Although the sub-motor 400 may be disposed on the lower plate 200, problems may occur when the sub-motor 400 is disposed on the lower plate 200 that is configured to rotate. In this regard, the sub-motor 400 is separately disposed below or on the bottom of the drive motor 100, and the sub-shaft 410 of the sub-motor 400 is connected to the connecting shaft 320 through the hollow interior of the drive shaft 110. Accordingly, the volume of a package including the motors may be reduced.

Here, the sub-shaft 410 and the connecting shaft 320 are connected to each other via a bearing B. The sub-shaft 410 is connected to the sub-motor 400 so as to move linearly in the upward and downward directions without rotating. The connecting shaft 320 is connected to the upper plate 300 such that the connecting shaft 320 may rotate while moving linearly in the upward and downward directions. Thus, the distal end of the sub-shaft 410 may be configured such that the distal end of the connecting shaft 320 is inserted thereinto. A bearing B is interposed between the sub-shaft 410 and the connecting shaft 320 such that the connecting shaft 320 is rotatable with respect to the sub-shaft 410.

The pivoting operation of the pivot units 210 will be described hereinafter. Each of the pivot units 210 includes a mounting end portion 211 on which a corresponding propeller blade of the propeller blades P is mounted and a pivot end portion 212 pivotably disposed on the lower plate 200. A guide pin 212a protrudes from a peripheral portion of the pivot end portion 212. Each of the guides 310 is configured to surround the corresponding pivot end portion 212. The guide 310 may have a guide hole 311 into which the guide pin 212a is inserted. The guide hole 311 may extend along a path in upward and downward directions.

As illustrated in FIG. 5, each of the pivot units 210 includes the mounting end portion 211, to which the corresponding propeller blade P is mounted and fixed, and the pivot end portion 212 pivotably disposed on the lower plate 200. The mounting end portion 211 of the pivot unit 210 may have a shape surrounding the propeller blade P such that the propeller blade P is firmly fixed thereto, or may be fastened by bolting or riveting or welded such that the propeller blade P is integrally coupled thereto. The pivot end portion 212 is integrally coupled to the mounting end portion 211 and is pivotably disposed on the lower plate 200 such that the position of the propeller blade P may be changed depending on the pivot position. The pivot end portion 212 may have a cylindrical shape, and includes the guide pin 212a inserted into the guide hole 311 of the guide 310. In particular, since the guide hole 311 of the guide 310 extends along the path, when the guide 310 is moved along with the movement of the upper plate 300 in the upward and downward directions, the guide pin 212a moves along the path of the guide hole 311, thereby changing the pivot position of the pivot unit 210.

In some forms, as illustrated in FIGS. 5 to 7, the guide hole 311 is comprised of a linear section 311a extending in the upward and downward directions and an inclined section 311b extending downward from the linear section 311a.

That is, the linear section 311a of the guide hole 311 causes the guide pin 212a to move along the linear section 311a only in the upward and downward directions so that the pivot position of the pivot unit 210 is not changed. Since only the position of the upper plate 300 is changed in the upward and downward directions, the pivot unit 210 may be allowed to pivot or the position of the pivot unit 210 may be fixed. Accordingly, the linear section 311a may extend to a length to which the pivot unit 210 is allowed to pivot when the upper plate 300 moves upwards.

The inclined section 311b extends from the linear section 311a with an incline. Thus, when the guide pin 212a moves along the inclined section 311b in response to the movement of the upper plate 300 in the upward and downward directions, the pivot position of the pivot unit 21 may be changed along the direction in which the inclined section 311b extends. The angle of inclination and the length of the inclined section 311b may be determined such that the pivot unit 210 pivots in response to the upward movement of the upper plate 300 so that the propeller blade P is folded.

The configuration of the linear section 311a and the inclined section 311b of the guide hole 311 as described above may be changed depending on the speed of rotation and the angle of rotation of the propeller blade P in response to the movement of the upper plate 300 in the upward and downward directions.

Thus, as illustrated in FIG. 6, when the upper plate 300 moves upwards, the guide 310 also moves upwards, so that the guide pin 212a moves along the linear section 311a of the guide hole 311. Accordingly, the pivot position of the pivot unit 210 is allowed to be changed with respect to the upper plate 300.

As illustrated in FIG. 7, when the upper plate 300 continuously moves upwards, the guide pin 212a enters the inclined section 311b of the guide hole 311 and then moves along the inclined section 311b. Consequently, the pivot position of the pivot unit 210 may be changed so that the propeller blade P may be folded or deployed.

Returning to FIG. 4, the lower plate 200 includes lower stoppers 230 around the pivot units 210. When the propeller blades P are moved to deployed positions or folded positions in response to the pivoting of the pivot units 210, the lower stoppers 230 restrict the pivoting of the pivot units 210. The lower stoppers 230 are provided in portions of the lower plate 200 with which the pivot units 210 come into contact then the propeller blades P are moved to the deployed positions or the folded positions. The lower plate 200 may be configured to be in contact with the mounting end portions 211 of the pivot units 210. The lower plate 200 and the mounting end portions 211 of the pivot units 210 may be configured to be in surface contact with each other.

In addition, each of the lower stoppers 230 extends to surround a portion of the corresponding pivot unit 210. The lower stopper 230 is configured to be in contact with the mounting end portion 211 of the pivot unit 210 when the propeller blade P is moved to the deployed position or the folded position. Since the lower stopper 230 is configured to extend along the circumference of the pivot unit 210 as described above, the strength of the lower stopper 230 supporting the pivot unit 210 is obtained, thereby increasing the stability of the pivot unit 210.

In addition, the upper plate 300 includes upper stoppers 330 extending downward and allowing the pivot units 210 to be seated therein, respectively. When the upper plate 300 is moved downwards, the positions of the pivot units 210 are fixed by the upper stoppers 330. Thus, the upper stoppers 330 of the upper plate 300 may have seating portions 340 surrounding and seating the pivot units 210 therein, respectively. Since the pivot units 210 are seated by the upper plate 300 in this manner, when the propeller blades P are rotated by the operation of the drive motor 100, the upper plate 300 may fix the pivot units 210 so that the propeller blades P may rotate at a high speed and vibration may be reduced.

The propeller folding apparatus of an air mobility vehicle according to the exemplary forms of the present disclosure as described above may operate as follows.

As illustrated in FIG. 1, in a position in which the propeller blades P are deployed, the upper plate 300 is moved toward the lower plate 200 to be in contact with the pivot units 210 so that the positions of the pivot units 210 are fixed. In this position, the air mobility vehicle may be in a vertical takeoff or landing position.

When the propeller blades P are folded, the sub-shaft 410 moves the connecting shaft 320 in response to the operation of the sub-motor 400, thereby moving the upper plate 300 upwards, so that the pivot positions of the pivot units 210 are in changeable states. In addition, the guides 310 are moved upwards together with the upper plate 300, and the guide pins 212a enter the inclined sections 311b and move along the inclined sections 311b, respectively, so that the pivot positions of the pivot units 210 are changed. Consequently, as illustrated in FIG. 8, the propeller blades P are pivoted along with the pivot units 210 so as to be folded. In this position, the air mobility vehicle may be flying at a high speed in the air.

As set forth above, the propeller folding apparatus of an air mobility vehicle according to some forms of the present disclosure may deploy or fold the propeller blades depending on the flying state of the air mobility vehicle. The propeller blades may be efficiently used depending on the flying state of the air mobility vehicle, thereby increasing the energy efficiency and the ferry range of the air mobility vehicle.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A propeller folding apparatus of an air mobility vehicle, the propeller folding apparatus comprising:
   a lower plate connected to a drive shaft of a drive motor generating a rotational force, wherein the lower plate includes:
      a pivot unit on which a propeller blade is mounted, wherein the pivot unit is configured to pivotably move and cause the propeller blade to be deployed or folded based on positions of the pivot unit;
   an upper plate disposed on the lower plate and configured to move in upward and downward directions such that the upper plate allows the pivot unit to pivot or causes the positions of the pivot unit to be fixed; and
   a guide coupled to the upper plate and connected to the pivot unit,
   wherein the guide is configured to change the positions of the pivot unit in response to the upper plate moving in the upward and downward directions so that the propeller blade is deployed or folded.

2. The propeller folding apparatus of claim 1, further comprising:
   a sub-motor including a sub-shaft coupled to the upper plate, wherein the sub-motor is configured to move the sub-shaft in the upward and downward directions so as to adjust a position of the upper plate in the upward and downward directions.

3. The propeller folding apparatus of claim 2, wherein:
   a drive shaft is coupled to a bottom portion of the lower plate,
   a connecting shaft extending downward from the upper plate is connected to a top portion of the lower plate, and
   the drive shaft and the connecting shaft are coaxially arranged to each other.

4. The propeller folding apparatus of claim 3, wherein the drive shaft has a cylindrical shape having a hollow interior, and the connecting shaft is inserted into the hollow interior of the drive shaft through the lower plate.

5. The propeller folding apparatus of claim 4, wherein:
the lower plate has a polygonal through-hole through which the connecting shaft extends, and
the connecting shaft includes:
a top end portion having a polygonal shape to match to the polygonal through-hole, and
a bottom end portion formed to match to the hollow interior of the drive shaft.

6. The propeller folding apparatus of claim 4, wherein the sub-motor is provided below the drive motor, and the sub-shaft is inserted into the drive shaft so as to be connected to the connecting shaft.

7. The propeller folding apparatus of claim 6, wherein the sub-shaft and the connecting shaft are connected to each other via a bearing, such that the sub-shaft is non-rotatable and the connecting shaft is rotatable.

8. The propeller folding apparatus of claim 1, wherein:
the pivot unit comprises a mounting end portion on which the propeller blade is mounted and a pivot end portion pivotably disposed on the lower plate, with a guide pin protruding from a peripheral portion of the pivot end portion, and
the guide is configured to surround the pivot end portion, and has a guide hole into which the guide pin is inserted, the guide hole extending along a path in upward and downward directions.

9. The propeller folding apparatus of claim 8, wherein the guide hole comprises: a linear section extending in the upward and downward directions, and an inclined section extending downward from the linear section.

10. The propeller folding apparatus of claim 9, wherein the linear section extends to a length to which the pivot unit is allowed to pivot when the upper plate moves upwards, and an angle of inclination and a length of the inclined section are determined such that the pivot unit pivots in response to an upward movement of the upper plate so that the propeller blade is folded.

11. The propeller folding apparatus of claim 8, wherein:
the lower plate comprises a lower stopper provided around the pivot unit, and
when the propeller blade is moved to a deployed position or a folded position in response to pivoting of the pivot unit, the lower stopper is configured to restrict the pivoting of the pivot unit.

12. The propeller folding apparatus of claim 11, wherein:
the lower stopper extends to surround a portion of the pivot unit, and
the lower stopper is configured to be in contact with the mounting end portion of the pivot unit when the propeller blade is moved to the deployed position or the folded position.

13. The propeller folding apparatus of claim 1, wherein the upper plate comprises an upper stopper extending downward and allowing the pivot unit to be seated therein, the upper stopper configured to fix the positions of the pivot unit when the upper plate is moved downwards.

* * * * *